(12) United States Patent
Rothschild et al.

(10) Patent No.: US 8,219,562 B1
(45) Date of Patent: Jul. 10, 2012

(54) EFFICIENT STORAGE AND RETRIEVAL FOR LARGE NUMBER OF DATA OBJECTS

(75) Inventors: Jeffrey Rothschild, Los Altos, CA (US); Peter Vajgel, Menlo Park, CA (US); Jason S. Sobel, San Francisco, CA (US); Robert C. Johnson, San Jose, CA (US)

(73) Assignee: Facebook, Inc., Menlo Park, CA (US)

( * ) Notice: Subject to any disclaimer, the term of this patent is extended or adjusted under 35 U.S.C. 154(b) by 239 days.

(21) Appl. No.: 12/620,359

(22) Filed: Nov. 17, 2009

Related U.S. Application Data

(60) Provisional application No. 61/221,507, filed on Jun. 29, 2009.

(51) Int. Cl.
*G06F 17/30* (2006.01)
(52) U.S. Cl. ........................................ 707/741
(58) Field of Classification Search .............. 707/2, 741; 709/217; 715/209
See application file for complete search history.

(56) References Cited

U.S. PATENT DOCUMENTS

| | | | | |
|---|---|---|---|---|
| 5,367,621 A * | 11/1994 | Cohen et al. | ................... | 715/209 |
| 6,065,010 A * | 5/2000 | Otsuka et al. | ................... | 1/1 |
| 7,000,245 B1 * | 2/2006 | Pierre et al. | ................... | 725/136 |
| 2004/0172618 A1 * | 9/2004 | Marvin | ................... | 717/116 |
| 2008/0197557 A1 * | 8/2008 | Khuu | ................... | 271/3.2 |
| 2009/0055508 A1 * | 2/2009 | Amador et al. | ................... | 709/217 |

* cited by examiner

*Primary Examiner* — Etienne Leroux
(74) *Attorney, Agent, or Firm* — Fenwick & West LLP

(57) ABSTRACT

A data object management scheme for storing a large plurality of small data objects (e.g., image files) in small number of large object stack file for storage in secondary storage (e.g., hard disks). By storing many individual data objects in a single object stack file, the number of files stored in the secondary storage is reduced by several orders of magnitude, from the billions or millions to the hundreds or so. Index data for each object stack file is generated and stored in primary storage to allow efficient and prompt access to the data objects. Requests to store or retrieve the data objects are made using HTTP messages including file identifiers that identify the files storing the data objects and keys identifying the data objects. A file server stores or retrieves the data object from secondary storage of a file server without converting the requests to NSF or POSIX commands.

16 Claims, 6 Drawing Sheets

EFFICIENT STORAGE AND RETRIEVAL FOR LARGE NUMBER OF DATA OBJECTS

CROSS-REFERENCE TO RELATED APPLICATION

This application claims priority under 35 U.S.C. §119(e) to U.S. Provisional Patent Application No. 61/221,507 entitled "Efficient Storage and Retrieval for Large Number of Data Objects," filed on Jun. 29, 2009, which is incorporated by reference herein in its entirety.

BACKGROUND

This invention relates to efficiently storing and retrieving a large number of data objects, and more particularly to an efficient data object management scheme that reduces overhead associated with metadata of the data objects.

Many large-scale applications require storage and retrieval of a large number of data objects. As the number of data objects stored in a file server is increased, the amount of the metadata used by the file server for file access is increased proportionally. Since the amount of metadata per file is generally constant, the overhead for metadata is exacerbated when the size of the data objects is relatively small. Thus a large number of very small files require significantly more metadata than a few large files, even if the total size for the stored files is the same.

As the number of data files in a file server increases, the metadata file typically becomes too large to be held in primary storage (e.g., memory). Such a large metadata file must, therefore, be stored in secondary storage (e.g., hard disks). As a result, to retrieve an arbitrary data object, multiple input/output (I/O) operations typically must be performed on the secondary storage to locate and retrieve first the metadata, and then the data object. The increased number of I/O operations on the secondary storage and relatively slow access speed of the secondary storage significantly increase the retrieval time of the data object.

An online photo storage application is an example of a large scale application that involves a large number of data objects with relatively small size, typically less than 1 Mb each, and frequently as small as a few hundred kilobytes. Users of photo storage application often upload image files (e.g., photograph files) for sharing with other users over Internet. Typically the uploaded image files are seldom deleted. As a result, the number of photos steadily increases over time. In some photo sharing applications, the total number of stored image files can reach into the billions, with the total amount of stored data being in the petabytes.

Conventional file systems do not scale well to such a large number of data objects. For example, a POSIX-compliant file system requires the following metadata for each file: file length, ID, storage block pointers, file owner, group owner, access rights, change time, modification time, last access time and reference counts. The large number of fields in a POSIX-compliant file system makes it difficult to store the metadata associated with a very large number of files in primary storage. Hence, the metadata in conventional file systems are often stored in secondary storage.

FIG. 1A is a functional block diagram illustrating the process of uploading image data objects in a conventional online photo sharing application. A photo upload server 108 receives image data objects embedded in HTTP messages from clients 104. The photo upload server 108 then stores the data objects in one or more of the storage servers 110 using, for example, NFS (Network File System) protocol. The storage servers 110 receives requests based on the NFS protocol and stores the image data object as a file using conventional file system. Each storage server 110 uses a POSIX compliant file system, and thus stores metadata for each image (e.g., an inode).

FIG. 1B is a functional block diagram illustrating the process of retrieving and sending image data objects to the clients 104. A HTTP request for an image file from one of the clients 104 is received at a content delivery network (CDN) 128 or a caching server 132. The request identifies the image file by its file name. If the requested image file is not cached in the CDN 128 or the caching server 132, the CDN 128 or the caching server 132 forwards the HTTP request to one of the content servers 116. After receiving the HTTP request, the requested content server 116 uses the file name to determine which of the storage server 110 stores the requested image file, and then translates the HTTP request into an NFS command to that storage server 110. The storage server 110 typically accesses the stored metadata based on the file name to determine the disk location information for the image file. This access will typically be to secondary storage, rather than to primary storage. The storage server 110 then retrieves the image file from disk, and passes it back to the content server 116. The content server 116 sends the retrieved image file to the requesting client via the CDN 128 or the caching server 132.

As can be seen from these examples, there is significant overhead in both the multiple disk access for both the metadata and the file data. There is also overhead that comes from the use of two protocols, HTTP and NFS, and in the addition operations needed by the content server to translate between protocols. Thus, it would be beneficial to have a system and method for efficiently storing and retrieving a large number of data objects, and more particularly to an efficient data object management scheme that reduces overhead associated with metadata of the data objects.

SUMMARY OF INVENTION

Embodiments provide a file server and a management scheme for storing a large number of data objects in secondary storage. For each data object for storage, a data container is generated and added to a file stored in the second storage. The file in the second storage stores a plurality of data containers. By adding a plurality of data objects to the file instead of storing each data object in an individual file, the number of files in the secondary storage is reduced. The reduced number of files results in reduced overhead associated with file management. Index data is generated to indicate offset locations in the file and the size of the data container. The index data is loaded and stored in primary storage of the file server to efficiently and promptly serve requests to retrieve the data objects.

The file server may store a plurality of the files, each file storing a plurality of data objects. A request to store a data object includes a file identifier indicating a file to store the data container. The file server receives the request to store the data object and determines the file to store the data object based on the file identifier included in the request. The request to store the data object may be in the form of a HTTP message. Each request to store may also include a key identifying the data object. The offset location and the size of the data container may be determined by searching for an entry in the index data corresponding to the key.

A request to retrieve a data object may include a file identifier indicating the file that stores the data object and a key identifying the requested data objet. The file server determines a file storing the requested data object based on the file identifier. Then the file server searches the index data corresponding to the determined file for the offset location in the file and the size of the data container associated with the requested data object based on the key. The file server then reads the data container from the file based on the offset location and the size of the data container.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

Embodiments of the present invention provide a data object management scheme that stores a large plurality of small data objects in small number of large object stack file for storage in secondary storage (e.g., hard disks). By storing many individual data objects in a single object stack file, the number of files stored in the secondary storage is reduced by several orders of magnitude, from the billions or millions to the hundreds or so.

In one embodiment, an object stack file concatenates a large number of data objects together. Each object stack file has an associated index that stores metadata about the locations of the data objects in the object stack file. The minimized number of metadata fields for efficient storage results in a reduced index size. The reduced size of the index allows the index to be loaded and retained in primary storage (e.g., memory).

In another aspect of the invention, the logical and physical architecture of a system for storing and retrieving the data objects is simplified by eliminating or reducing translation operations associated with conventional file system protocols. In one embodiment, this is done by using a direct access method in which data objects are referenced by object stack file identifier and a data object identifier in an HTTP request. The object stack file identifier identifies the object stack file storing the data object. The data object identifier identifies the data object stored in the object stack file.

A data object described herein refers to any type of data items for storing and transmitting. The data object may include, but is not limited to, image data (e.g. photograph file), document, audio data, and video data.

Architecture and Operation of System

Figure 1A:
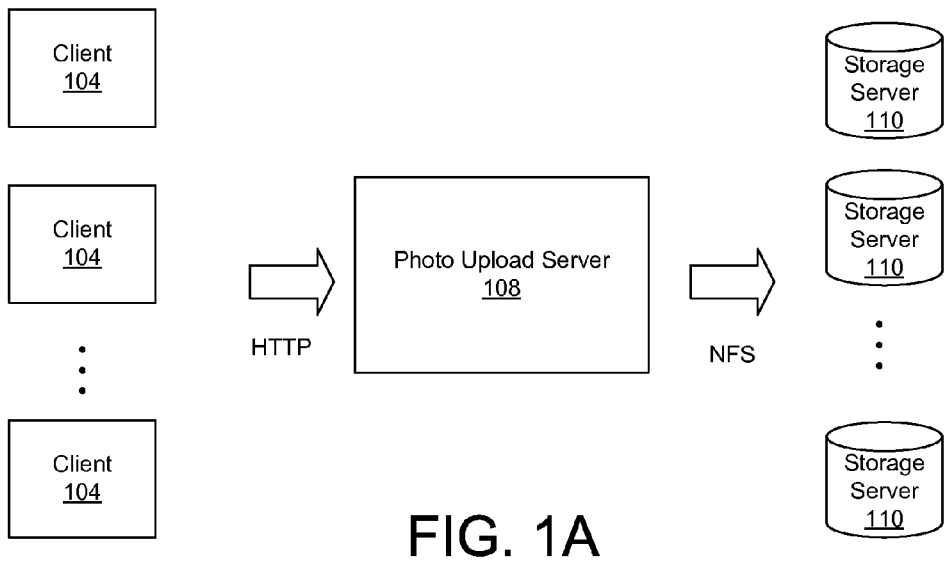
FIG. 1A is a functional block diagram illustrating the process of uploading image data objects in a conventional online photo sharing application.
Figure 1B:
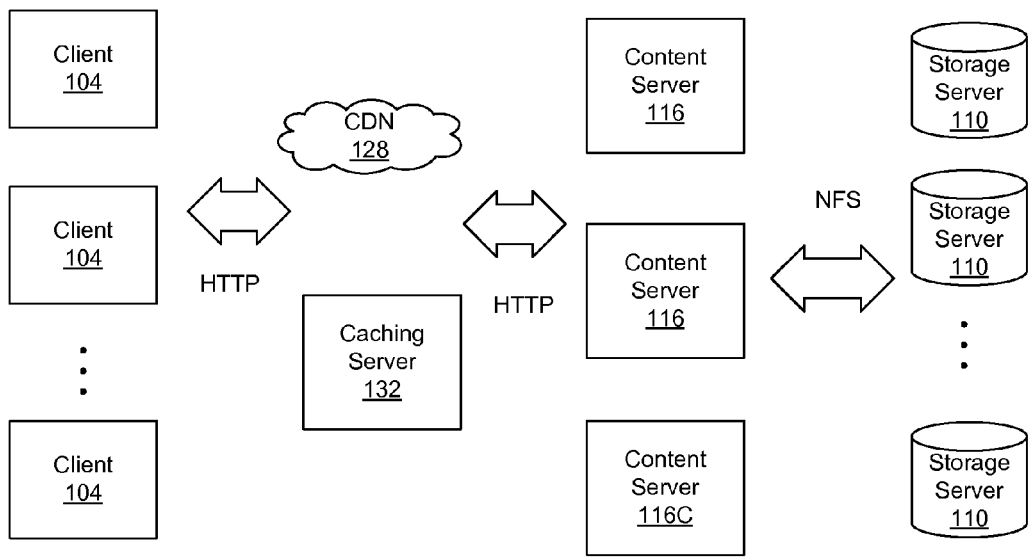
FIG. 1B is a functional block diagram illustrating the process of retrieving and sending image data objects in a conventional online photo sharing application.
Figure 2A:
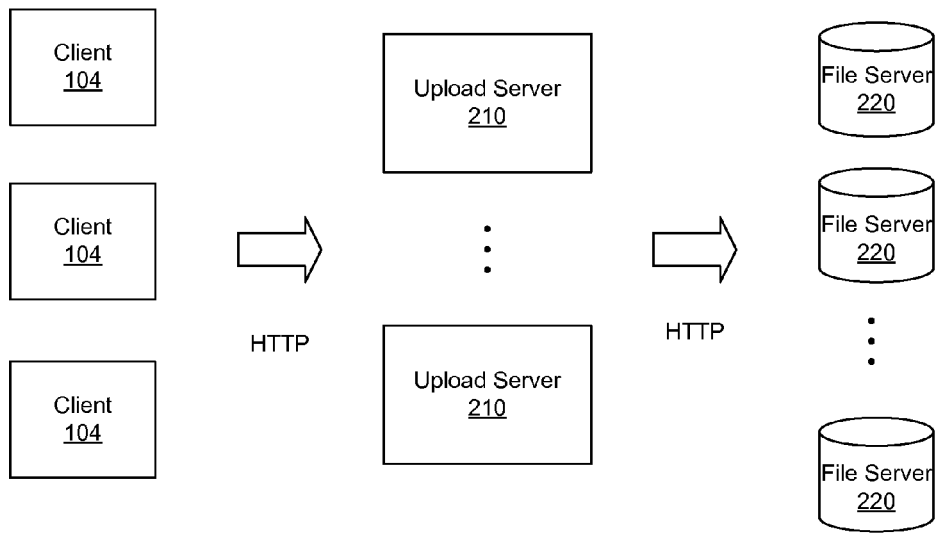
FIG. 2A is a functional block diagram illustrating components of a system associated with uploading of data objects, according to one embodiment.
Figure 2B:
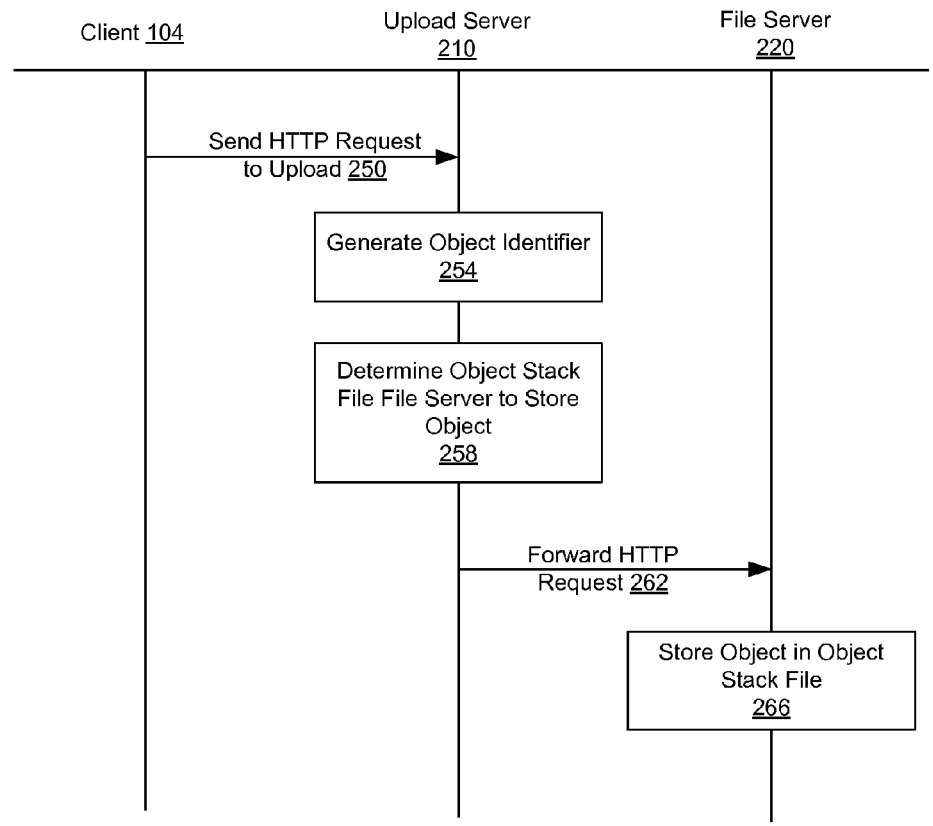
FIG. 2B is an interaction diagram illustrating the process of uploading the data objects, according to one embodiment.

FIG. 2A is a functional block diagram illustrating components of a system associated with uploading of data objects, according to one embodiment. FIG. 2A is explained herein in conjunction with FIG. 2B illustrating an interaction diagram associated with uploading of the data objects, according to one embodiment. To upload data objects, clients 104 send 250 HTTP requests to upload servers 210. The clients 104 are computers or other electronic devices used by one or more users to interact with the file server 220. The clients 104 include, among others, laptop computers, desktop computers, cellphones, smartphones and game consoles. The clients 110, for example, can be personal computers executing a web browser that allows the user to browse and search for information available at a website associated with the file server 220.

An upload server 210 receives the HTTP request for uploading a data object from one of the clients 104. The receiving upload server 210 generates 254 an identifier for the object, selects the object stack file to store the data object, and determines 258 the file server 220 in which the object stack file is stored. The upload server 210 forwards 262 the HTTP request to the file server 220 to store the data object, using the object stack identifier and object data identifier.

The file server 220 is a computing device that manages data objects by storing multiple data objects in the form of object stack files. An object stack file has a data structure for storing a plurality of data objects, as described below in detail with reference to FIG. 5. Each file server 220 stores one or more object stack files, each of which is identified by a unique object stack identifier (ID). The number of object stack files in a file server 220 may be determined based on, among other factors, storage capacity of the file server 220. In an example, each file server 220 stores approximately one hundred object stack files, each object stack file having the size of 100 Gigabytes. The file server 220 may include hardware, software, firmware or a combination thereof for interacting with the clients 104 via a network, as described below in detail with reference to FIG. 4. The selected file server 220 receives the HTTP request and stores 266 the data object of the HTTP request in the object stack file.

Figure 3A:
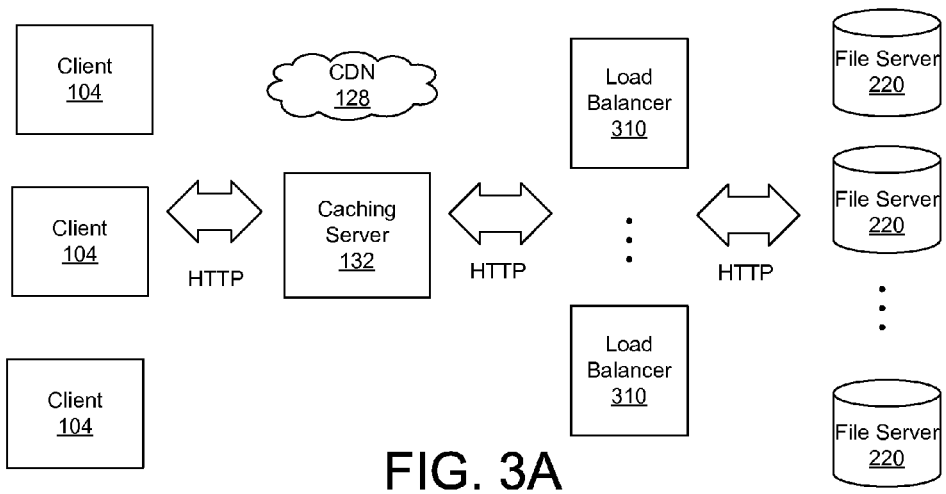
FIG. 3A is a functional block diagram illustrating components of a system associated with downloading of data objects, according to one embodiment.
Figure 3B:
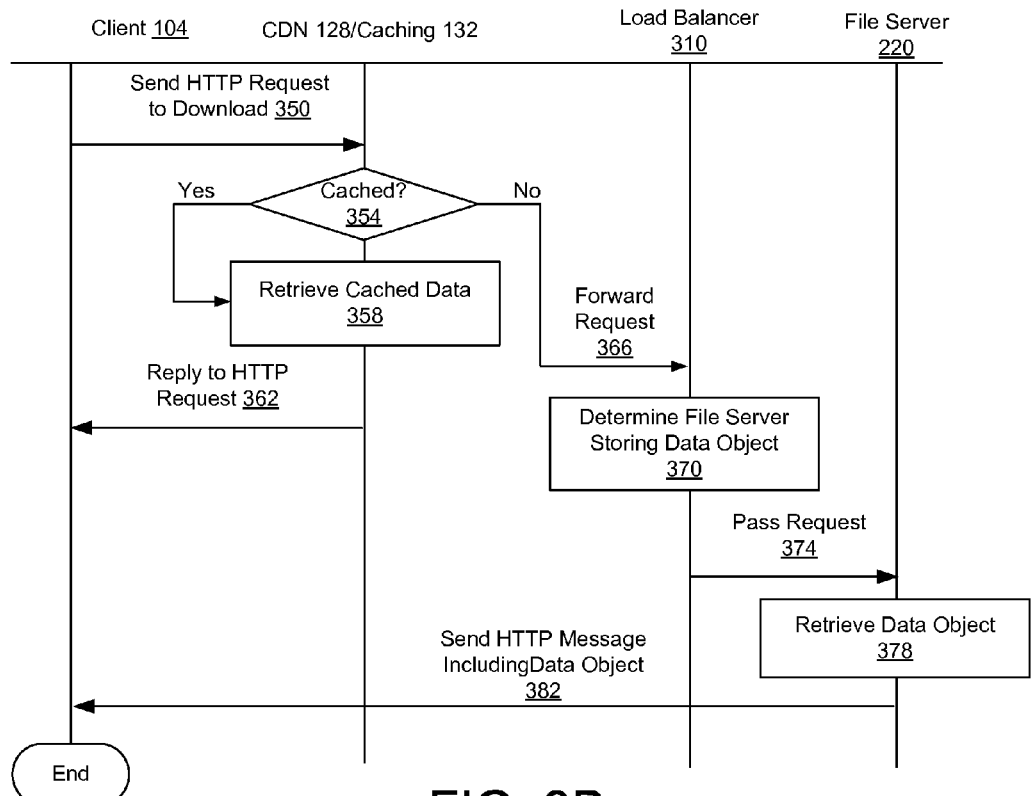
FIG. 3B is an interaction diagram illustrating the process of downloading the data objects, according to one embodiment.

FIG. 3A is a functional block diagram illustrating components of a system associated with downloading of data objects, according to one embodiment. FIG. 3A is explained herein in conjunction with FIG. 3B illustrating an interaction diagram associated with downloading of the data objects, according to one embodiment. The process is initiated by one of the clients 104 sending 350 a HTTP request to a content delivery network (CDN) 128 or a caching server 132 requesting a data object using the identifier of the data object. The CDN 128 or the caching server 132 determines 354 if the requested data object is cached. If the data object is cached on the CDN 128 or the caching server 132, the CDN 128 or the caching server 132 retrieves 358 the data object and replies 362 to the HTTP request for data object by sending the data object to the client 104.

If the data object is not cached, the CDN 128 or the caching server 132 forwards 366 the HTTP request to one of the load balancers 310. The load balancer 310 determines 370 which file server 220 stores the data object, based on the identifier embedded in the HTTP request, and passes 374 the HTTP request to the determined file server 220. After receiving the HTTP request, the file server 220 retrieves 378 the data objects and sends 382 an HTTP message including the data objects to the requesting clients 104 directly or via the CDN 128 or the caching server 132.

The file server 220 is more efficient at retrieving the data objects requested by the clients 104 because, among other reasons, (i) index data for the data objects are loaded and retained in the primary storage of the file server, and (ii) translation of HTTP requests to NFS commands is omitted, as described below in detail. The efficient retrieval capability of the file server 220 allows less reliance on the CDN 128 and/or the caching server 132. In some cases, the CDN 128 and/or the caching server 132 may be removed totally.

Structure of File Server

Figure 4:
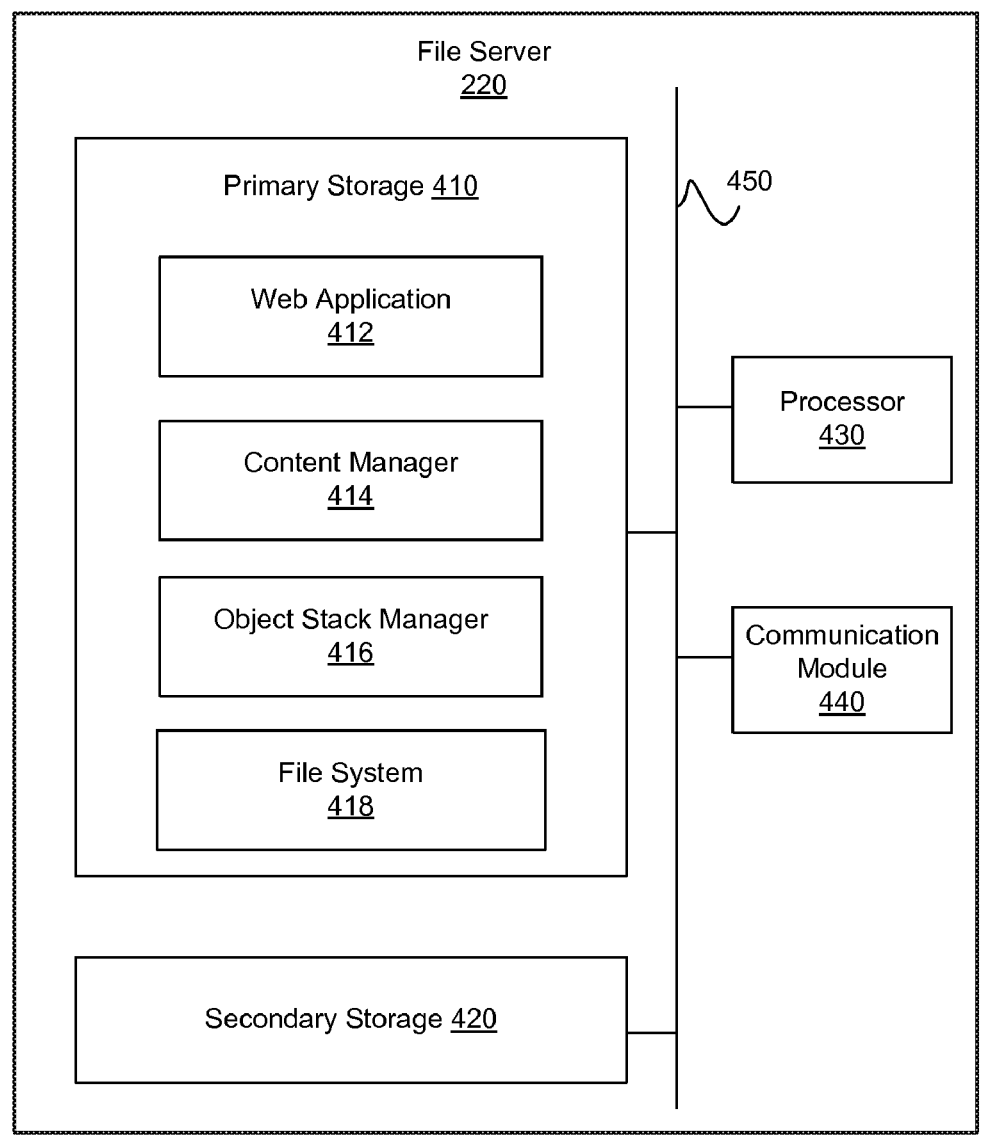
FIG. 4 is a functional block diagram illustrating a file server 220, according to one embodiment.

FIG. 4 is a functional block diagram illustrating a file server 220, according to one embodiment. The file server 220 includes, among other components, primary storage 440, secondary storage 420, a processor 430 and a communication module 440. These components are connected to each other via a bus 450. The file server 220 may have different and/or other components than those shown in FIG. 4. Various conventional components (e.g., operating system, input/output devices, peripheral interfaces, and the like) are not shown so as to not obscure the details of this embodiment.

The secondary storage 420 is a mass storage device for storing, among others, object stack files. The secondary storage 420, for example, may be embodied as one or more hard discs, for example in a RAID (Redundant Array of Inexpensive Disks) or other configuration. Alternatively, the storage 420 may be embodied in other forms of computer readable storage media, including optical storage media, magnetic storage media, a solid-state memory device, or their equivalents.

The communication module 440 couples the file server 220 to a network for communicating, for example, with the clients 104, the upload servers 210, the load balancers 310, the CDN 128 and the caching server 132.

The processor 430 may be one or more processors for carrying out instructions stored in the primary storage 440. Two or more processors may be used to provide added processing capacity.

The file server 220 may also include a disk cache that provides faster data access speed compared to the primary storage. Typically, data objects are accessed more or less randomly, and thus disk reads do not benefit much by the caching operation. Hence, caching may be reserved only for writing operations. Alternatively, the disk cache may be disabled to guarantee data consistency in the event of a crash or a power loss.

The primary storage 440 is a storage device, such as RAM, that has a faster data access speed but limited data capacity compared to the secondary storage 420. The primary storage 410 stores various software modules for serving requests from the clients 104 and managing data objects stored in the secondary storage 420. The primary storage 410 may store, among other modules, a web application 412, a content manager 414, an object stack manager 416 and a file system 418.

The web application 412 receives HTTP requests from the clients 104 and responds to the HTTP requests by sending data contents via the network. The data contents may be web pages such as HTML documents and linked data objects. The web application 412 may be implemented using an evhttp server provided with the open source libevent library. Multiple threads may be processed simultaneously by the web application 412 where each thread serves a single HTTP request at a time.

The content manager 414 receives HTTP requests for a data object via the web application 412 and translates the HTTP requests to data object management operations. The data object management operations may include, among others, storing of data objects, reading of data objects and other management operations associated with object stack files.

The upload server 210 may generate different versions of the data object before storing the data object in the secondary storage 420. For example, in one embodiment, the upload server 210 receives an image data object and generates four different image data objects of different sizes (e.g., large, medium, small and thumbnail). The upload server 210 may assign the same key value to different versions of the data objects derived from the same data object. In order to distinguish one version of the data object from another version of the same data object, alternate key values may be assigned to different versions of the same data object, as described below in detail with reference to FIG. 6.

The object stack manager 416 manages storing and retrieval of data objects. The object stack manager 416 may be placed logically on top of the file system 418. Alternatively, the object stack manager 416 may operate independently without the assistance of the file system 418. The object stack manager 416 maintains one or more object stack files, and for each object stack file, a corresponding index file. The generate index files are stored in the secondary storage 420 and loaded onto the primary storage as index data.

The index data stored in the primary storage 410 are preferably minimized to ensure that the index data fit within the primary storage 410. The object stack manager 416 may use as hash tables such as open source Google sparse hash data structure to keep the index data in the primary storage small. The Google sparse hash data structure is advantageous because only 2 bits of overhead are needed per entry.

The file system 418 may be used to manage files in the secondary storage 420. The file system 418 maintains metadata of files including mapping relationship between files and physical locations of data in the secondary storage 420. At least two different types of well known file systems may be used to store the object stacks: (i) a block-based file system, and (ii) an extent-based file system. In one embodiment, the file system 418 is embodied as a XFS file system, which is an extent-based file system created by Silicon Graphics.

Data object management operations such as adding of the data objects are performed by the object stack manager 416. The file system 418 is generally inefficient in managing a large number of files. The file system 418 is reserved for operations associated with the entire object stack file but not individual data objects. The file system 418, for example, performs copying, moving or deleting of an entire object stack file. By combining multiple data objects into a single object stack file, the number of files managed by the file system 418 is drastically reduced. In this way, the file system 418 may operate more efficiently. Further, the file system 418 also requires various metadata associated with any file. By reducing the number of files, metadata overhead associated with the files may also be reduced.

HTTP for Direct File Access

A HTTP file access protocol is used to provide for very efficient and direct file access. A HTTP request from the upload server 210 to upload the data object to the file server 220 is a simple POST request identifying the URI (Uniform Resource Identifier) of the file server 220. For example, the HTTP request identifies the data object for uploading by the following file name:

[pvid]_[key]_[cookie]_[size].jpg where [pvid] indicates the object stack file identifier, [key] indicates the identifier for the data object, [cookie] indicates a string of characters to prevent unauthorized access to the data object, and [size] indicates the version of the data object. The file server then appends the data object to the object stack file. The file server 220 then updates the index to include the metadata for the data object, specifically the location of the start of the data object in the object stack file, and the data object identifier.

A HTTP request from the client 104 to receive a data object is a simple GET method identifying the URI (Uniform Resource Identifier) of the file server 220 storing the data object. The HTTP request also identifies the data object to retrieve using the same file name convention for uploading the data object.

The POST and GET methods are processed by the content manager 414 and the object stack manager 416 without translating the HTTP request to NSF or POSIX commands. Accordingly, this approach eliminates the need for a separate physical or logical tier to translate the HTTP request into NFS (Network File System) or POSIX commands.

Object Stack and Index File

Figure 5:
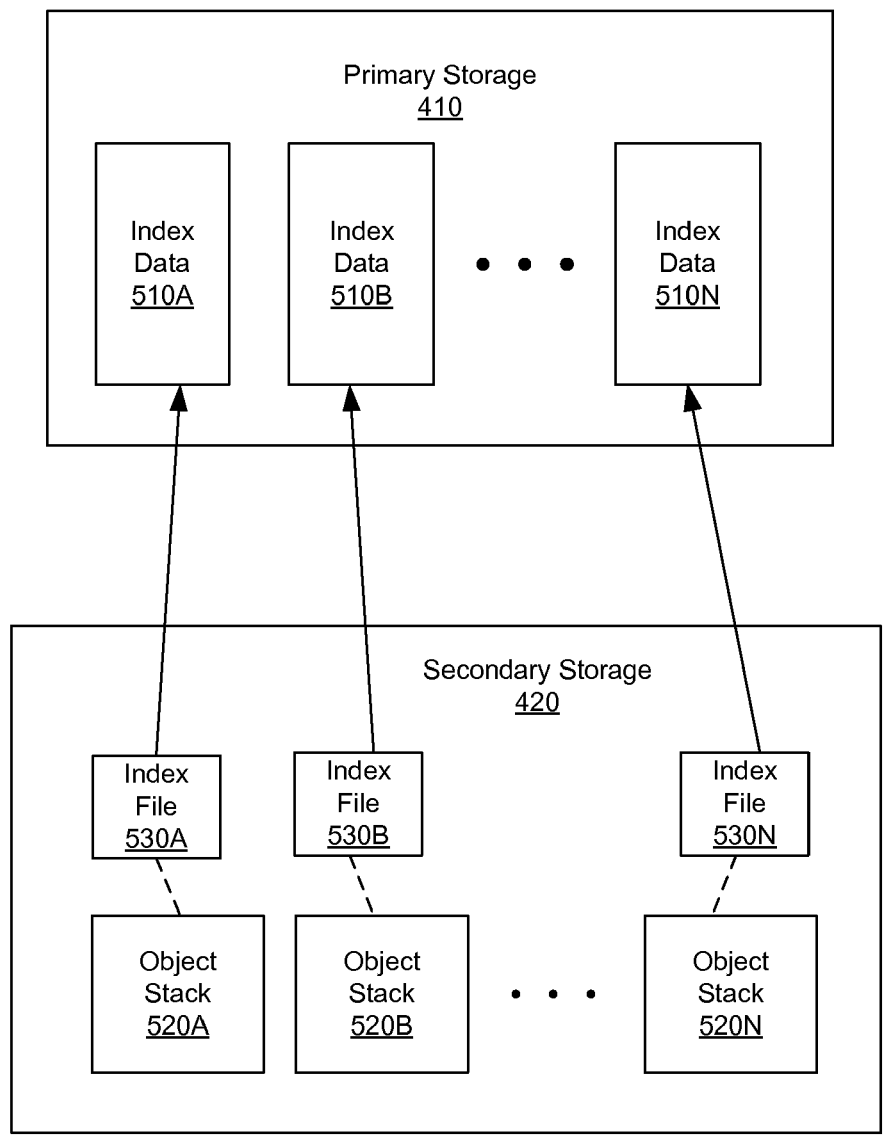
FIG. 5 is a diagram illustrating the association of index data, index data files and object stack files, according to one embodiment.

FIG. 5 is a diagram illustrating the association of index data 510A through 510N (hereinafter collectively referred to as "the index data 510"), index data files 530A through 530N (hereinafter collectively referred to as "the index file 530") and object stack files 520A through 520N (hereinafter collectively referred to as "the object stack files 520"), according to one embodiment. Each index 510 includes entries indicating the locations of data objects in one of the object stack files 520.

A conventional file system such as POSIX requires many metadata fields that are not relevant to certain applications. For example, it has been observed that in photo sharing applications that store image files, (i) data objects are seldom deleted or modified, and (ii) access control is seldom an issue because virtually all users of the application are granted access to the data objects with minimal restrictions. Hence, metadata in a POSIX-compliant file system related to modification of data objects and limiting access are largely irrelevant in photo sharing applications.

Accordingly, in one embodiment of the present invention, the index data 510 may be streamlined by eliminating such irrelevant metadata and retaining only the metadata needed for the retrieval of the data objects. By minimizing the metadata in the index data 510, the index data 510 may be loaded and retained in the primary storage 410. Retaining the index data 510 in the primary storage 410 is advantageous because, among other reasons, the location of the data object may be identified without performing multiple I/O operations on the secondary storage 420.

The index files 530 are stored in the secondary storage 420 and loaded to the index data 510 at the startup of the file server 220. During the data object management operations, the index files 530 need not be synchronized with the object stacks 520 and the index data 510. Instead, the data in the index data 510 may be flushed periodically to the index files 530 for backup purposes.

Figure 6:
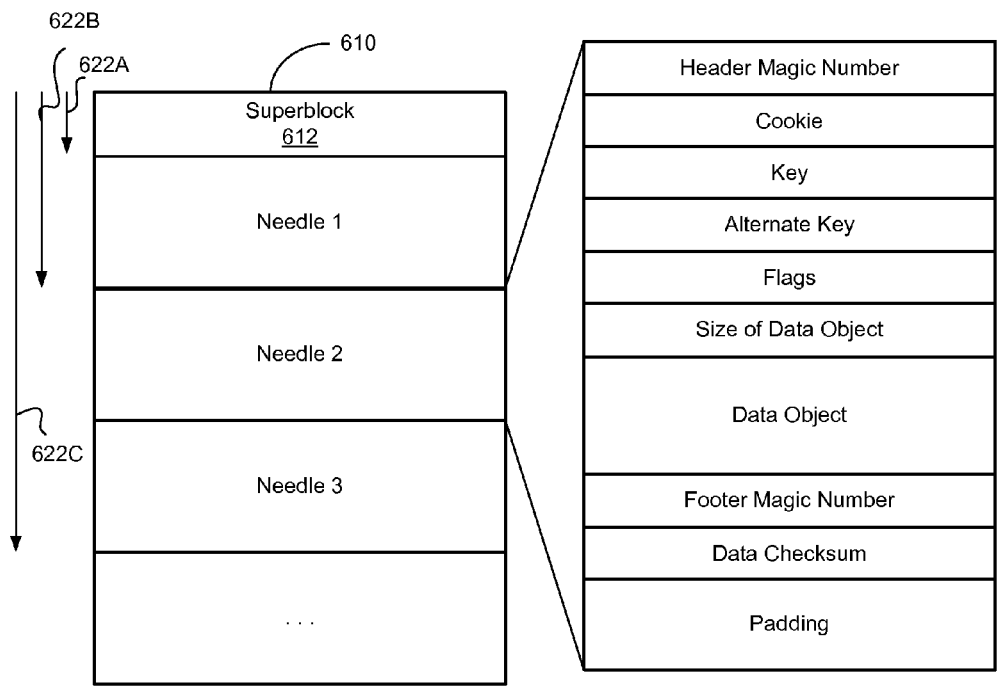
FIG. 6 is a diagram illustrating the data structure of an object stack file, according to one embodiment.

FIG. 6 is a diagram illustrating the data structure of an object stack file 610, according to one embodiment. The object stack file has a log data structure containing a plurality of "needles." Each needle is a container for one object data and metadata associated with the object data. As illustrated in FIG. 6, the object stack file 610 may include, for example, a superblock 612, needle 1, needle 2, needle 3, etc.

Each needle in the object stack file starts from an offset bit location immediately after the ending bit of the previous needle. If there is no preceding needle, the needle start immediately after the ending bit of the superblock. The needles 2 and 3, for example, start at offset bit locations 622B (after needle 1 ended) and 622C (after needle 2 ended), respectively. The offset bit locations are stored in the index file 530 or index 510 as offset values, as described below in detail with reference to FIG. 7.

The metadata in the needle are less restrictive compared to the metadata in the index data 510 because the needle is retained in the secondary storage 420. The metadata in the needle may include, among others, a head magic number, a cookie, a key, an alternate key, flags, the size of the data object, a footer magic number, and a data checksum. The header magic number identifies the next possible needle during recovery when the object stack file becomes corrupt. The cookie is a string of characters generated by the upload servers 210 when uploading a data object and is used to prevent unauthorized access to the data object by brute force attack. The combination of the key and the alternative key are used to uniquely identify a data object stored in the file server 220. As described above, different versions of the same data object may be generated and stored in the file server 220. In such case, the same key may be assigned to different versions of the same data object. Different alternative keys may be used to identify different versions of the same data object. The key may be 64 bits and the alternate key may be 32 bits. The flags, among others, indicate whether the data object has been deleted. The footer magic number is used for finding the possible end of the needle when the data becomes corrupt in the object stack file. The data checksum indicates the checksum for the data object section of the object stack file. The padding is added to the needle to align the size of the needle. For example, the padding may be added to align the total size of the needle to multiples of 8 bytes.

Figure 7:
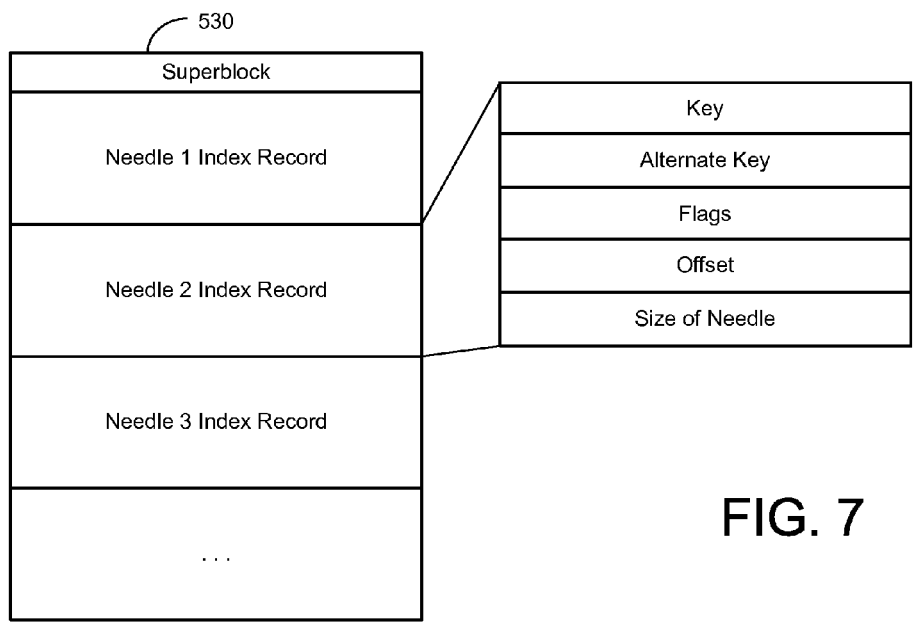
FIG. 7 is a diagram illustrating the data structure of an index file, according to one embodiment.

FIG. 7 is a diagram illustrating the data structure of an index file 530, according to one embodiment. Each index data 510 in the primary storage 410 has essentially the same data structure as the index file 530. The index file 530 and the index data 510 include needle index records for needles stored in an object stack file 520. The order of the needle index records in the index file 530 or the index 510 preferably matches the order of the associated needles in the object stack file to allow more expedient locating of needles. The index file 530 may also include a superblock at the beginning of the file.

Each needle index record in the index data 510 or the index file 530 includes minimal metadata for locating a particular needle in the object stack file. The metadata in the index record may include, for example, a key, an alternate key, flags, an offset value and the size of the needle. The key, the alternate key and flag are described above with reference to FIG. 6. The offset value indicates offset bit location in the object stack file where the corresponding needle starts, as described above with reference to FIG. 6. By using the combination of offset and the size of the needle, a chunk of data corresponding to the needle can be identified and retrieved from the secondary storage 420 in a single read operation.

By loading the index files 530 into the primary storage device, data objects stored in the secondary storage 420 may be located efficiently and promptly. Hence, the file server 220 can serve an increased number of HTTP requests per unit time. The efficient operation of the file server 220 advantageously reduces reliance on the CDN 128 and/or the caching server 132.

The object stack manager 416 may generate the index file 530 based on the object stack file 610. After the index file 530 is generated, the content manager 414 loads the data of the index file 530 to the index 510 in the primary storage 410. The object stack manager 416 or the content manager 4141 may organize the index 510 for more efficient lookup of needle index records.

Object Stack Based Operations

When writing a data object to an object stack file, the content manager 414 synchronously appends a new needle containing the data object to the object stack file 520. After the needle is appended to the object stack file 520, corresponding index records are added to the index data 510 and/or the index file 530. Because updating of the index file 530 is not critical, index records may be written asynchronously for faster performance.

Overwriting of an existing needle may be prohibited. When data in the needle requires modification, a new needle is created to include the modified data instead of updating a needle already present in the object stack file. The new needle is assigned the same key and alternative key as the previous needle. When there are multiple needles with the same key and alternative key, the needle with the largest offset value may be assumed to be the most recent needle and disregard needles with smaller offsets. In applications such as storing image files in a photo sharing system, the data objects are rarely modified. Therefore, the prohibition of overwriting incurs minimal reduction in storage efficiency.

The index data 510 may also be periodically flushed to the index files 530 in the secondary storage 420 to mitigate loss caused by hardware failures. In the case of a crash or a sudden power loss, the recovery process discards any partial needles in the object stack file and truncates the object stack file to the last valid needle. Then, the missing index records are written for any trailing orphan needles at the end of the object stack file.

When reading a data object from an object stack file, the content manager 414 determines an object stack ID, key and alternate key from the client's HTTP request. The content manager 414 identifies the index file 530 for the correct object stack file 520, and locates entries in the files matching the key and the alternate key included or derived from the HTTP request. When there are multiple entries matching the combination of key and alternate key, the content manager 414 selects the needle with the highest offset values as the most recent needle.

The read operation may be successfully performed when all of the following conditions are met: (i) the cookie included in the client's HTTP request matches the cookie stored in the needle, (ii) the data passes data checksum validation, and (iii) the flags indicate that the needle has not been deleted. If any of these conditions are not met, the read operation fails.

When performing the reading operation, the object stack manager 416 reads the entire needle from the object stack file based on the offset value and the size of the needle. The offset value and the size of the needle is stored in the needle index record (loaded in the primary storage 410); and therefore, the object stack manager 416 need not access the secondary storage 420 to determine the location of the needle in the object stack file. Therefore, the object stack manager 416 may retrieve the entire needle from the secondary storage 420 by a single I/O operation.

The deletion of a data object may be performed simply by setting the flag field in the needle and/or the index data as being "deleted". If the flag field in the associated index data is not updated for some reason, the object stack manager 416 may reference a deleted needle. Hence, the flag field in the object stack file may also be verified during a read operation to determine whether the reading operation should fail. The space of a deleted needle need not be reclaimed in any way.

The needle of the deleted data object is retained in the object stack file until a compacting operation is performed. The compacting operation may be performed after the object stack file is filled up. The object stack manager 416 may perform compaction to reclaim the space used by the deleted and duplicate needles. Duplicate needles are needles containing the same data object are identified by the same key and alternate key. The object stack manager 416 creates a new object stack file by copying needles while skipping any duplicate or deleted needles. After creating the new object stack file, the index files are newly generated and loaded to the primary storage 410.

Alternative Embodiments

Embodiments described herein are described primarily with reference to uploading and retrieving of image files. The same data object management scheme, however, may be applied to various other data items such as documents, audio data, and video data. The data object scheme described herein is more advantageous when the data objects are small and inefficient and expensive for management in a DBMS (Database Management System).

Embodiments described herein are also described primarily with reference a social networking service accessed by multiple client devices. The same data object management scheme may also be applied to other network-based services that require multiple client devices to share the data objects via a centralized storage server. The embodiments are also applicable to non-network based services where a large number of data objects are received and stored.

Further, the data objects stored in the object stack file need not be of the same type. Different types of data objects may be stored in a single object stack file. Alternatively, different object stack files in a file server may be dedicated to storing data objects of a certain type.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer-implemented method for storing data, the method comprising:
    receiving requests to store a plurality of data objects in a storage system, the storage system having a primary storage and a secondary storage;
    adding a data object to one of a plurality of files in the secondary storage, the file storing the plurality of data objects;
    generating index data including an offset location of each data object and a size of each data object that is stored in the file in the secondary storage;
    storing the index data in the primary storage for locating data objects in the file in the secondary storage;

generating, for each data object, a plurality of versions of a data object, each version of the data object having a different size; and assigning a same first key to each version of the same data object and assigning a different second key to each version of the data object, the first key and the second key stored in the index data to locate the offset location and the size of the data object.

2. The method of claim 1, wherein each request to store comprises a file identifier indicating the file in which to store the data object, and a data object to be stored.

3. The method of claim 2, wherein each request to store further comprises a key identifying the data object, wherein the index data indexes the offset location and the size of each data object based on the key.

4. The method of claim 1, further comprising:
receiving a request to retrieve the stored data object in the secondary storage, the request to retrieve including a file identifier indicating the file storing the data object and a key identifying the requested data object;
determining a file storing the requested data object based on the file identifier;
searching the index data for an offset location and a size of the data object based on the key; and
retrieving the data object from the file based on the offset location and the size of the data object from the index data.

5. The method of claim 1, further comprising:
assigning values in flag fields associated with the plurality of data objects;
deleting a data object by modifying a flag field associated with the data object being deleted; and
compacting the file including the deleted data object by copying data objects that are not deleted into an updated file.

6. The method of claim 1, wherein each of the plurality of data objects is included in a data container for storing in one of the plurality of files, each data container further comprising metadata associated with each of the plurality of data objects.

7. A file server for storing data, the storage system including primary storage and secondary storage, comprising:
a communication module configured to receive requests to store a plurality of data objects for storage in a storage system, the storage system having a primary storage and a secondary storage;
a content manager configured to generate, for each data object, a plurality of versions of a data object, each version of the data object having a different size;
an object stack manager configured to:
add a data object to one of a plurality of files in the secondary storage, the file storing the plurality of data objects;
generate index data representing an offset location of each of the plurality of data objects and a size of each data object that is stored in the file in the secondary storage; and
assign a same first key to each version of the same data object and assign a different second key to each version of the data object, the first key and the second key stored in the index data to locate the offset location and the size of a data container storing versions of the data object; and
primary storage configured to store the index data for locating data objects in the file in the secondary storage.

8. The file server of claim 7, wherein each request to store comprises a file identifier indicating the file in which to store the data object, and a data object to be stored.

9. The file server of claim 8, wherein each request to store further comprises a key identifying the data object, wherein the index data indexes the offset location and the size of each data object based on the key.

10. The file server of claim 7, wherein:
the communication module is further configure to receive a request to retrieve the stored data object in the secondary storage, the request to retrieve including a file identifier indicating the file storing the data object and a key identifying the requested data object; and
the object stack manager is further configured to:
determine a file storing the requested data object based on the file identifier;
search the index data for an offset location and a size of the data object associated with the requested data object based on the key; and
retrieve the data object from the file based on the offset location and the size of the data object from the index data.

11. The file server of claim 7, wherein the object stack manager is further configured to:
assign values in flag fields associated with the plurality of data objects;
delete a data object by setting a flag field associated with the data object being deleted; and
compact the file including the deleted data object by copying data objects that are not deleted into an updated file.

12. The file server of claim 7, wherein each of the plurality of data objects is included in a data container for storing in one of the plurality of files, each data container further comprising metadata associated with each of the plurality of data objects.

13. A non-transitory computer-readable storage medium storing instructions for storing data, the instructions when executed by a processor, cause the processor to:
receive requests to store a plurality of data objects for storage in a storage system, the storage system having a primary storage and a secondary storage;
add a data object to one of a plurality of files in secondary storage, the file storing the plurality of data objects;
generate index data including an offset location of each data object and a size of each data object that is stored in the file in the secondary storage;
store the index data in primary storage for locating data objects in the file in the secondary storage;
generate, for each data object, a plurality of versions of a data object, each version of the data object having a different size; and
assign a same first key to each version of the same data object and assign a different second key to each version of the data object, the first key and the second key stored in the index data to locate the offset location and the size of the data object.

14. The computer-readable storage medium of claim 13, wherein each request to store further comprises a key identifying the data object, wherein the index data indexes the offset location and the size of each data object based on the key.

15. The computer-readable storage medium of claim 13, further comprising instructions to:
receive a request to retrieve the stored data object in the secondary storage, the request to retrieve including a file identifier indicating the file storing the data object and a key identifying the requested data object;
determine a file storing the requested data object based on the file identifier;

search the index data for an offset location and a size of the data object associated with the requested data object based on the key; and retrieve the data object from the file based on the offset location and the size of the data object from the index data.

16. The computer-readable storage medium of claim 13, further comprising instructions to:

assign values in flag fields associated with the plurality of data objects;

delete a data object by setting a flag field associated with the data object being deleted; and compact the file including the deleted data object by copying data objects that are not deleted into an updated file.

* * * * *